(12) United States Patent
Li

(10) Patent No.: US 11,398,741 B2
(45) Date of Patent: Jul. 26, 2022

(54) CHARGING DEVICE AND A CHARGING METHOD THEREOF

(71) Applicant: Anker Innovations Technology Co., Ltd., Changsha (CN)

(72) Inventor: Ping Li, Changsha (CN)

(73) Assignee: Anker Innovations Technology Co. Ltd., Changsha (CN)

( * ) Notice: Subject to any disclaimer, the term of this patent is extended or adjusted under 35 U.S.C. 154(b) by 176 days.

(21) Appl. No.: 16/652,409

(22) PCT Filed: Feb. 9, 2018

(86) PCT No.: PCT/CN2018/076004
§ 371 (c)(1),
(2) Date: Mar. 30, 2020

(87) PCT Pub. No.: WO2019/061987
PCT Pub. Date: Apr. 4, 2019

(65) Prior Publication Data
US 2020/0295581 A1    Sep. 17, 2020

(30) Foreign Application Priority Data
Sep. 30, 2017  (CN) .......................... 201710927742.2

(51) Int. Cl.
*H02J 7/00*     (2006.01)
(52) U.S. Cl.
CPC ............ *H02J 7/007* (2013.01); *H02J 7/0013* (2013.01); *H02J 7/00036* (2020.01); *H02J 7/0045* (2013.01); *H02J 7/0047* (2013.01)
(58) Field of Classification Search
CPC ...... H02J 7/0045; H02J 7/0047; H02J 7/0013; H02J 7/007; H02J 7/00036
(Continued)

(56) References Cited

U.S. PATENT DOCUMENTS 7,373,222 B1 * 5/2008 Wright ...................... H02J 3/14
700/20
7,664,136 B2 * 2/2010 Toebes .................. H04L 12/10
370/463
(Continued)

FOREIGN PATENT DOCUMENTS

CN      102938573 A     2/2013
CN      103828181 A     5/2014
(Continued)

OTHER PUBLICATIONS

Jun. 29, 2019 (WO) International Search Report—App. PCT/CN2018/076004.
(Continued)

*Primary Examiner* — Edward Tso
*Assistant Examiner* — Aaron Piggush
(74) *Attorney, Agent, or Firm* — Banner & Witcoff, Ltd.

(57) ABSTRACT

The present disclosure provides a charging device and a charging method thereof. The charging device includes a control unit, at least two charging protocol chips electrically connected to the control unit, and at least two interfaces respectively connected to the at least two charging protocol chips; wherein each of the at least two charging protocol chips is configured to detect a power requirement of each charged device electrically connected to the each interface; wherein the control unit is configured to calculate a total power requirement of all charged devices according to each power requirement of the charged devices; and according to a magnitude between the total power requirement and a total available supplying power of the charging device, and according to a preset power allocation rule, the control unit configure to allocate a supplying charging power of to each interface electrically connected with a charged device.

17 Claims, 3 Drawing Sheets

(58) Field of Classification Search
USPC .......................... 320/107, 114, 119, 132, 134
See application file for complete search history.

(56) References Cited

U.S. PATENT DOCUMENTS

| | | | |
|---|---|---|---|
| 9,935,482 B1* | 4/2018 | Leabman | H02J 50/23 |
| 2010/0181961 A1* | 7/2010 | Novak | H02J 7/00034 |
| | | | 320/108 |
| 2016/0336745 A1* | 11/2016 | Pandya | H02J 7/007182 |
| 2017/0192474 A1* | 7/2017 | Robinson | H02J 7/02 |
| 2019/0073012 A1* | 3/2019 | Sultenfuss | H02J 7/007 |

FOREIGN PATENT DOCUMENTS

| | | | |
|---|---|---|---|
| CN | 103986217 A | 8/2014 |
| CN | 205319740 U | 6/2016 |
| CN | 107681720 A | 2/2018 |
| WO | 2016183466 A1 | 11/2016 |

OTHER PUBLICATIONS

Oct. 8, 2019 (CN) Office Action—App. 201701927757.9.
Jul. 12, 2019 (CN) Office Action—App. 201701927742.2.

* cited by examiner

CHARGING DEVICE AND A CHARGING METHOD THEREOF

FIELD

The described embodiments relate to a charging circuit technology, and more particularly, to a charging device and a charging method thereof.

BACKGROUND

Currently, charging products on the market, such as portable power bank, only have standard USB interfaces and micro USB interfaces. There is no charging device have multiple charging port with Type-C interfaces. However, it is foreseeable that with more and more power delivery devices in the future, the charging device with multiple charging ports will be used by users in more and more situations, so that it is necessary to provide a charging device having multiple Type-C interfaces to implement charging simultaneously.

SUMMARY

A technical problem mainly solved by the present disclosure is to provide a charging device and a charging method, which may be configured to allocate the out charging power in each interface when multiple charged devices are charged at the same time.

In order to solve the above-mentioned technical problem, a technical solution adopted by the present disclosure is to provide a charging device including a control unit, at least two charging protocol chips electrically connected to the control unit, and at least two interfaces respectively connected to the at least two charging protocol chips; each of the at least two charging protocol chips is configured to detect a power requirement of each charged device electrically connected to each interface; wherein the control unit is configured to calculate a total power requirement of all charged devices according to each power requirement of the each charged devices; and according to a magnitude between the total power requirement and a total available supplying power of the charging device, and according to a preset power allocation rule, the control unit configure to allocate a supplying charging power of to each interface electrically connected with a charged device.

In order to solve the above-mentioned technical problem, a technical solution adopted by the present disclosure is to provide a charging method, including: detecting power requirement of at least two charged devices, by charging protocol chips; calculating a total power requirement of all charged devices according to each power requirement of the each charged device, by a control unit; allocate a supplying charging power of to each interface electrically connected with charged device, by the control unit, according to a magnitude between the total power requirement and the total available supplying power of a charging device, and according to a preset power allocation rule.

The beneficial effects of the present disclosure is that, a charging device and a charging method thereof of the present disclosure, use a control unit to calculate a total power requirement according to each power requirement of each charged device detected by each corresponding charging protocol chip, so that to achieve allocating the output charging power to each charged device electrically connected to charging protocol chips. It may ensure that when at least two charged devices are charged by the charging device at the same time, one of the at least two charged devices may be fully power charged or high power charged.

DETAILED DESCRIPTION

In order to make the objectives, the technical solutions, and the technical effects of the present disclosure clearer, the following further describes the present disclosure in detail. It should be understood that, the specific implementation regulations described here are only used in explaining the present disclosure, it is not intended to limit the present disclosure.

The technical features involved in various embodiments of the present disclosure described below may be combined with each other as long as they do not conflict with each other.

The present disclosure provides a charging device, which may charge multiple devices and may realize a dynamic configuration of output power.

Figure 1:
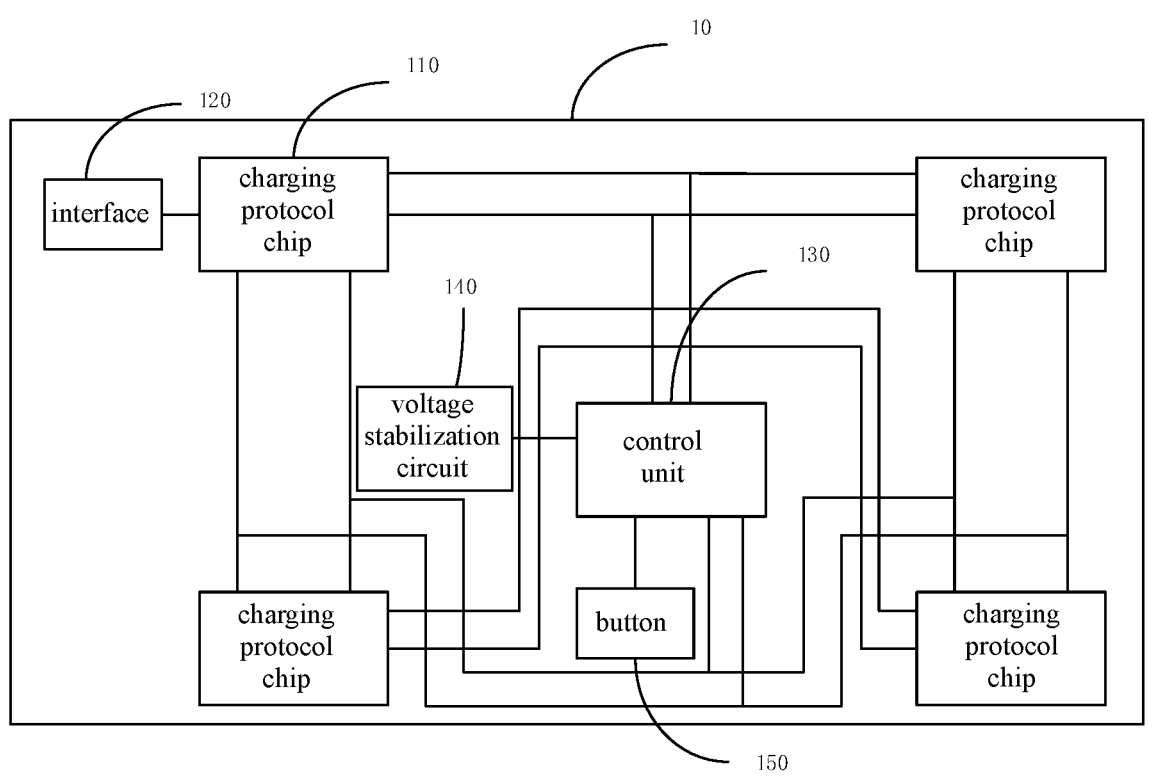
FIG. 1 is a circuit illustration of a charging device in accordance with an embodiment in the present disclosure.

Referring to FIG. 1, FIG. 1 is a circuit illustration of a charging device in accordance with an embodiment in the present disclosure.

In this embodiment, the charging device 10 may include a control unit 130, at least two charging protocol chips 110, and at least two interfaces 120 respectively connected to the at least two charging protocol chips 110.

The charging protocol chip 110 may be configured to detect a power requirement of a charged device electrically connected to the interface 120. The control unit 130 may calculate a total power requirement according to each power requirement of each charged device detected by the corresponding charging protocol chip 110. The control unit 130 may configure to allocate a supplying charging power of to each interface 120 electrically connected with the charged device 110, according to a magnitude between the total power requirement and the total available supplying power of the charging device 10, and according to a preset power allocation rule.

When the total available supplying power of the charging device 10 is less than the total power requirement, the allocation of output charging power of the interfaces 120 connected with charged devices may be optimized. Further, when the total available supplying power of the charging device 10 is greater than the total power requirement, the output charging power of the charging device output from the interface 120 to its connected charged device may be equal to the power requirement of the connected charged device.

In this embodiment, the charging protocol chip 110 may detect a power requirement of the charged device connected to charging protocol chip 110. A handshake communication may be performed between the charging protocol chip 110 and the charged device based on a universal charging protocol to detect the power requirement of the charged device electrically connected to the charging protocol chip 110. The power requirement may be voltage, current, or power information required by the charged device. For example, the universal charging protocol may be a USB power delivery protocol (USB PD).

In this embodiment, the preset power allocation rule may be to charge a low-power requirement charged device by full power first. The control unit 130 may control the charging protocol chips 100 to charge a low-power requirement charged device by full power first. In this embodiment, the preset power allocation rule may be to charge a high-power requirement charged device first under a premise that to charge each other charged devices by minimum chargeable charging power. The control unit 130 may control each charging protocol chip to configure minimum chargeable charging power to each other charged devices, and allocate the residual available supplying power of the charging device to the high-power requirement charged device.

In this embodiment, the control unit 130 may reallocate the output charging power of each interface 120 electrically connected with charged devices, when a new charged device is plugged into or the charged devices unplugged from the charging device 10.

The control unit 130 may be further configured to re-allocate the output charging power to the each interface electrically connected with the charged device, when the output current of at least one of the interface 120 is less than or equal to a preset threshold.

The preset threshold may be a current value of trickle charging, i.e., when the charging device detects that a charged device connected to an interface has entered a trickle charging state, the output power of each interface may be re-allocated.

In this embodiment, the control unit 130 may optimize the output charging power of the each interface 120 electrically connected with a charged device, according to the total power requirement of all charged devices connected to the charging device 10, and according to the magnitude between the total power requirement and the total available supplying power of the charging device 10, and according to the preset power allocation rule. Therefore, the charging device may make it possible to provide a fully power charged or high power charged state for some charged devices, when multiple charged devices are charged simultaneously.

In this embodiment, the interface 120 may be a Type-C interface. The control unit 130 may be a micro controller unit (MCU) connected to four charging protocol chips 110.

In this embodiment, the four charging protocol chips 110 may use an inter-integrated circuit (I2C) bus, and may adopt a Type-C port controller (TCPC) technology to send the detected charging requirements (including all power requirement) to the control unit 130. The control unit 130 may re-allocate the output power of each Type-C interface 120 according to a new requirement detected by the charging protocol chips 110. The control unit 130 may ensure that at least one charged device is charged with a fully power charging state when all the charged devices are charged. The I2C bus may be a bus for connecting a microcontroller and its peripheral devices, and may be a bus standard widely used in the field of microelectronic communication control.

In a case, the charging device 10 may provide total power of 150 W. The protocol chip 110 corresponding to each Type-C interface 120 may perform the handshake communication with the charged device corresponding to that Type-C interface(e.g., a mobile phone), and may detect the power requirement of the each charged device corresponding to each Type-C interface 120. Initial output power configured for each Type-C interface 120 may be 100 W. After the handshake communication, the charging device 10 may determine that power requirement of a charged device plugged into a first Type-C interface 120 may be 87 w, and power requirement of a charged device plugged into the second Type-C interface 120 may be 61 w, and power requirement of a charged device plugged into the third Type-C may be 45 W, the power requirement of a charged device plugged in the fourth Type-C interface 120 may be 30 W. The control unit 130 may calculate total power requirement according to power requirement of all the four charged device detected by each charging protocol chip 110. The control unit 130 may allocate the output power of each interface 120 electrically connected with a charged device 110. When the preset power allocation rule is to charge a low-power requirement device by full power first, the 30 W power requirement of the fourth Type-C interface 120 may be meet first, and the charging device is remained a 120 W available supplying power, and then the 45 W power requirement of the third Type-C interface may be meet, and 75 W available supplying power is remained, and then the charging requirement of 61 W of the second Type-C interface may be meet, and 14 W available supplying power is remained, and finally the remained 14 W available supplying power may be supplied to the first Type-C interface 120.

For another case, when the preset power allocation rule is to charge a high-power requirement charged device first under a premise that to charge each other charged devices by minimum chargeable charging power, and take an example that minimum chargeable charging power of each Type-C interface 120 is 15 W, the output charging power of the first Type-C interface 120 may be 87 W, and 33 W available supplying power is remained (150−87−15−15=33), i.e., the second Type-C interface may only provide 33 W output charging power, and the remaining two Type-C interfaces may both have 15 W power to output. The specific power allocation rules may be preset according to actual requirements in practice, and there may be many types, therefore no additional description is given herein.

In this embodiment, the charging device 10 may further include a button 150 connected to the control unit 130.

In this embodiment, the charging device 10 may further include a voltage stabilization circuit 140 connected to the control unit 130.

In this embodiment, the charging protocol chip 110 may be electrically connected to the charged device through a TYPE-C interface.

In this embodiment, the control unit 130 may manage the charging protocol chip 110 according to a Type-C port control technology and a Type-C port management technology.

Figure 2:
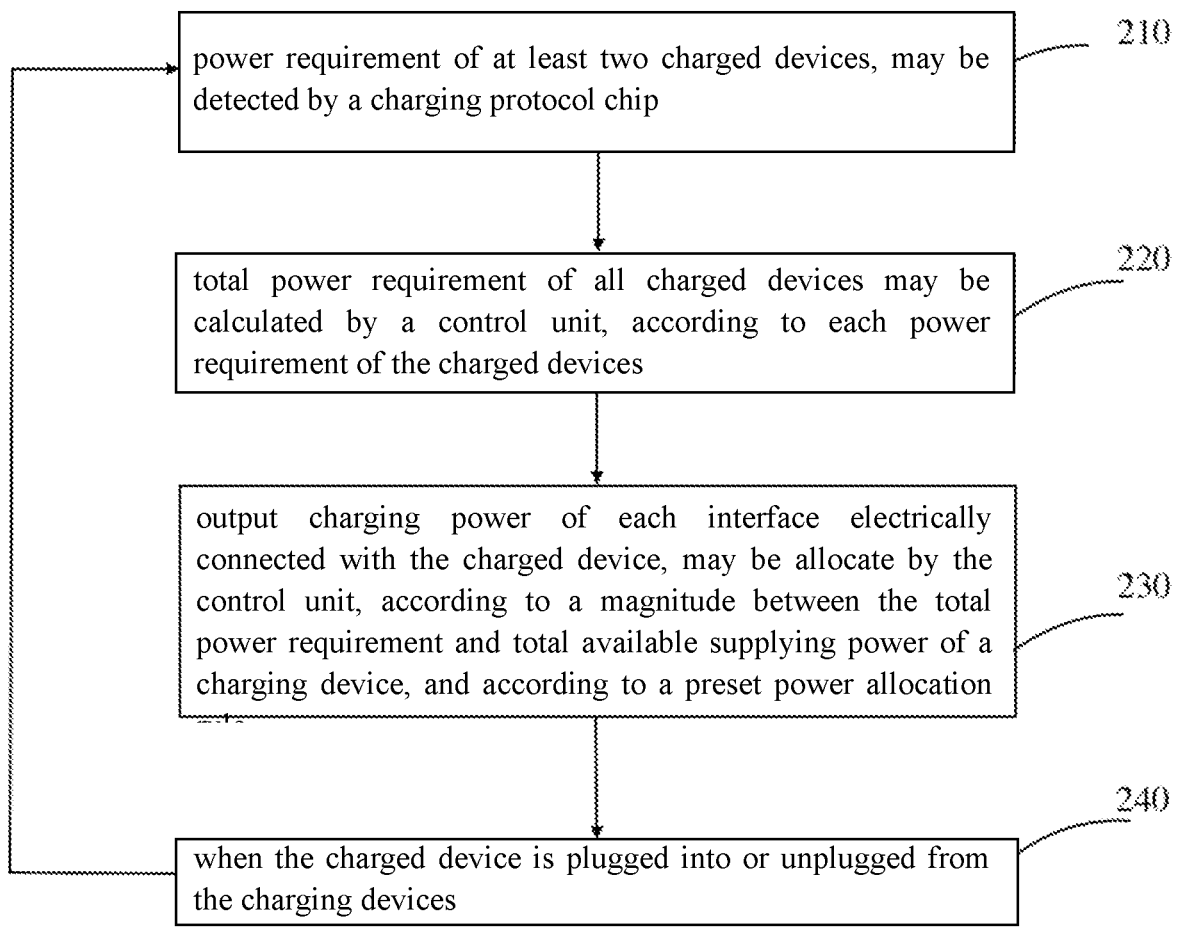
FIG. 2 is a flow chart of a charging method in accordance with an embodiment in the present disclosure.

Referring to FIG. 2, FIG. 2 is a flow chart of a charging method in accordance with an embodiment in the present disclosure. The method may include operations in the following blocks Block 210, a power requirement of each at least two charged devices, may be detected by a charging protocol chip.

Block 220, a total power requirement of all charged devices may be calculated by a control unit, according to each power requirement of the charged devices.

Block 230, output charging power of each interface electrically connected with a charged device, may be allocated by the control unit, according to a magnitude between the total power requirement and total available supplying power of a charging device, and according to a preset power allocation rule.

The operations in block 230 may include that, when the total available supplying power of the charging device is less than the total power requirement, the output charging power of the each interface electrically connected with a charged device, may be allocated, according to the preset power allocation rule. The operations in block 230 may further include that, when the total available supplying power of the charging device is greater than the total power requirement, the output charging power of the each interface connected with a charged device may be equal to the power requirement corresponding to the charged devices.

The operations in block 210 may further include operations in the following blocks.

Block 211, a handshake communication between the charging protocol chip and the charged device, may be performed based on a universal charging protocol.

Block 212, the power requirement corresponding to the charged device, may be detected by the charging protocol chip.

The charging requirement may be voltage, current, or power information required by the charged device. For example, the universal charging protocol may be a USB power delivery protocol (USB PD).

In a case, the preset power allocation rule is to charge a low-power requirement device by full power first.

The operations in block 230 may include that, the charging protocol chip may be controlled to charge a low-power requirement device by full power first.

In a case, the preset power allocation rule is to charge a high-power requirement charged device first under a premise that to charge each other charged devices by minimum chargeable charging power.

The operations in block 230 may include operations in the following blocks.

Block 231, each of the at least two charging protocol chips, may be controlled, to allocate the minimum chargeable charging power to each charged devices.

Block 232, allocate the residual available supplying power of the charging device to the high-power requirement charged device.

The charging method may further include operations in the following blocks.

Block 240, block 210 to block 230 of the charging method may be re-executed, when the charged device is plugged into or unplugged from the charging device, i.e., the output power may be reconfigured.

Figure 3:
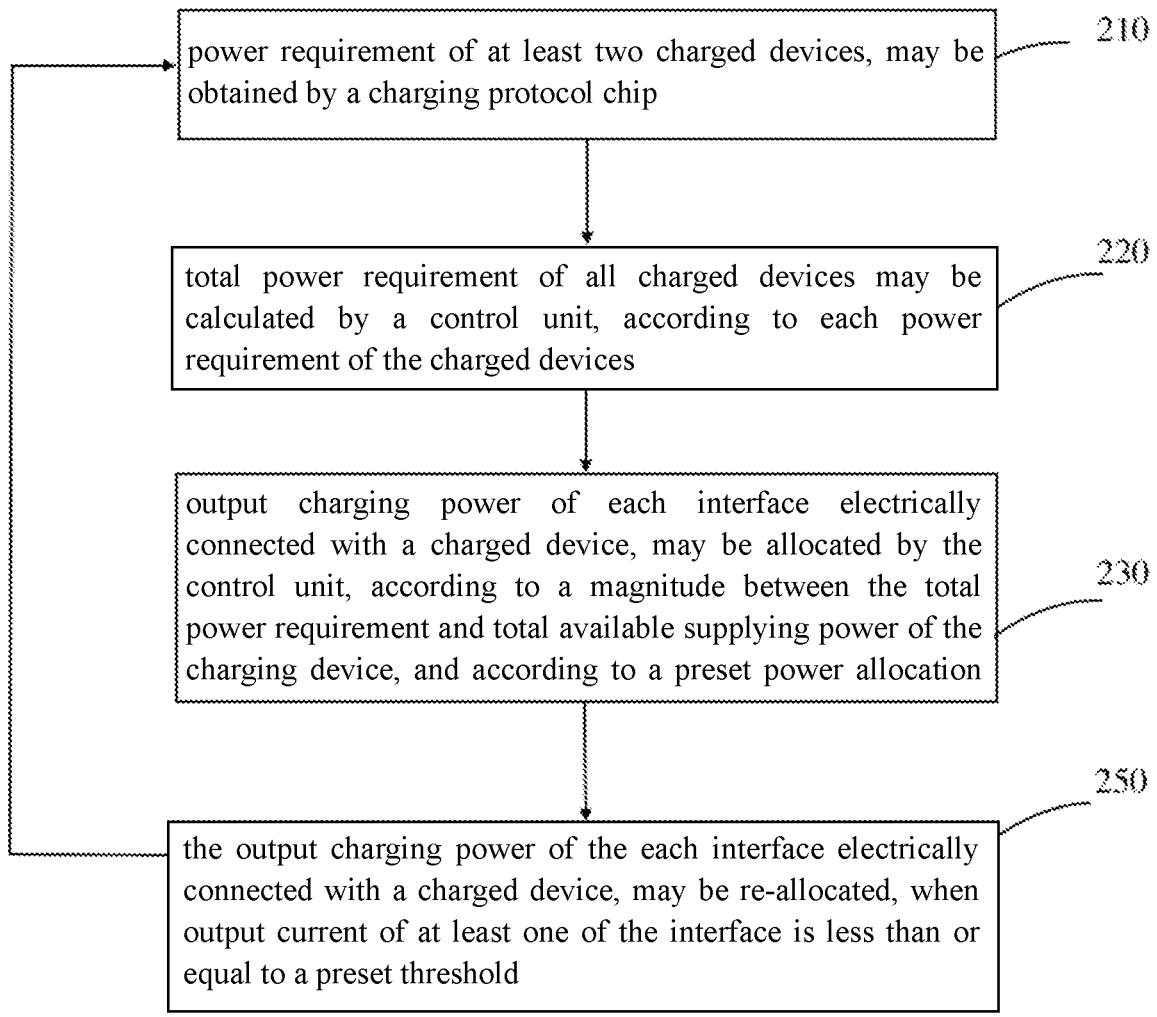
FIG. 3 is a flow chart of a charging method in accordance with another embodiment in the present disclosure.

Referring to FIG. 3, the charging method may further include operations in the following blocks.

Block 250, the output charging power of the each interface electrically connected with a charged device, may be re-allocated, when output current of at least one of the interface is less than or equal to a preset threshold. The preset threshold may be a current value of trickle charging, i.e., when the charging device detects that a charged device connected to an interface has entered a trickle charging state, the output power of each interface may be reconfigured.

The above-mentioned block 240 and block 250 may coexist in this embodiment of the charging method, but there is no sequence. For details that are not exhaustive in this embodiment, reference may be made to the above-mentioned embodiment, therefore no additional description is given herein.

In this embodiment, the charging method may optimize the output power of the each interface electrically connected to the charged device, according to the total power requirement of all charged devices detected from the each power requirement of the charged devices, and according to the magnitude between the total power requirement and the total available supplying power of the charging device, and according to the preset power allocation rule. Therefore, the charging method may ensure the possible guarantee to provide a fully power charging state for some charged devices, when multiple charged devices are charged simultaneously.

The charging device in the present disclosure may use the control unit to obtain the power requirement according to the charging protocol chip, and may calculate the total power requirement of all interfaces according to the power requirement. The charging device may further optimize the output power of the charging protocol chip electrically connected to the charged device, so that a dynamical configuration may be implemented, and required power charged may be ensure.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A charging device comprising:
   a control unit;
   at least two charging protocol chips electrically connected to the control unit; and
   at least two interfaces respectively connected to the at least two charging protocol chips,
   wherein each of the at least two charging protocol chips is configured to detect a power requirement of a respective one of a plurality of devices;
   wherein each of the plurality of devices is electrically connected to a respective one of the at east two interfaces; and
   wherein the control unit is configured to:
      allocate a charging power for each of the plurality of devices based on a power requirement of each of the plurality of devices, a total available supplying power of the charging device, and a power allocation rule, the power allocation rule being charging a low-power requirement device by full power first,
      control each of the at least two charging protocol chips to charge the respective one of the plurality of devices, and
      control one of the at least two charging protocol chips to charge a low-power requirement device of the plurality of devices by full power first.

2. The charging device of claim 1, wherein
   the control unit is configured to reallocate the charging power associated with the at least two interfaces based on another device being plugged into the charging device or one of the plurality of devices being unplugged from the charging device.

3. The charging device of claim 1, wherein the control unit is configured to reallocate the charging power associated with one of the at least two interfaces based on a determination that an output current of the one of the at least two iterfaces is less than or equal to a threshold.

4. The charging device of claim 1, wherein:
   one of the at least two interfaces is a Type-C interface; and
   the control unit is configured to receive a power requirement from each of the at least two charging protocol chips via an inter-integrated circuit by a Type-C port controller.

5. A charging method comprising:
   controlling, by a control unit, each of at least two charing protocol chips to detect a power requirement of a respective one of a plurality of devices, wherein each of the plurality of devices is electrically connected to a respective one of at east two interfaces, and wherein the at least two interfaces are respectively connected to the at least two charging protocol chips;

allocating, by the control unit, a charging power requirement for each of the plurality of devices based on a power requirement of each of the plurality of devices, a total available supplying power, and a power allocation rule, the power allocation rule being charging a low-power requirement device by full power first;

controlling, by the control unit, each of the at least two charging protocol chips to charge the respective one of the plurality of devices; and controlling, by the control unit, one of the at least two charging protocol chips to charge a low-power requirement device of the pluraliy of devices by full power first.

6. The charging method of claim 5, further comprising: determining a total power requirement of the plurality of devices based on the power requirement of each of the plurality devices.

7. The charging method of claim 5, wherein the controlling each of at least two charging protocol chips to detect the power requirement of the respective one of the plurality of devices comprises:
performing a handshake communication between each of the at least two charging protocol chips and the respective device based on a universal charging protocol.

8. The charging method of claim 5, further comprising: reallocating the charging power associated with the at least two interfaces base on another device being plugged into a charging device or one of the plurality of devices being unplugged from the charging device.

9. The charging method of claim 5, further comprising: reallocating the charging power associated with one of the at least two interfaces based on a determination that an output current of the one of the at least two interfaces is less than or equal to a threshold.

10. The charging device of claim 1, wherein the control unit is configured to determine a total power requirement of the plurality of devices based on the power requirement of each of the plurality devices.

11. The charging device of claim 1, wherein the control unit is configured to control each of at least two charging protocol chips to detect the power requirement of the respective one of the plurality of devices by performing a handshake communication between each of the at least two charging protocol chips and the respective device based on a universal charging protocol.

12. A charging system comprising:
a microcontroller;
at least two charging protocol chips electrically connected to the microcontroller; and
at least two interfaces respectively connected to the at least two charging protocol chips, wherein each of the at least two charging protocol chips is configured to detect a power requirement of a respective one of a plurality of devices; and wherein each of the plurality of devices is electrically connected to a respective one of the at least two interfaces; and wherein the microcontroller is configured to:
allocate a charging power for each of the plurality of devices based on a power requirement of each of the plurality of devices, a total available supplying power of a charging device, and a power allocation rule, the power allocation rule being charging a low-power requirement device by full power first,
control each of the at least two charging protocol chips to charge the respective one of the plurality of devices, and
control one of the at least two charging protocol chips to charge a low-power requirement device of the plurality of devices by full power first.

13. The charging system of claim 12, wherein the microcontroller is configured to reallocate the charging power associated with the at least two interfaces based on another device being plugged into a charging device or one of the plurality of devices being unplugged from the charging device.

14. The charging system of claim 12, wherein the microcontroller is configured to reallocate the charging power associated with one of the at least two interfaces based on a determination that an output current of the one of the at least two interfaces is less than or equal to a threshold.

15. The charging system of claim 12, wherein:
one of the at least two interfaces is a Type-C interface; and
the microcontroller is configured to receive a power requirement from each of the at least two charging protocol chips via an inter-integrated circuit by a Type-C port controller.

16. The charging system of claim 12, wherein the microcontroller is configured to determine a total power requirement of the plurality of devices based on the power requirement of each of the plurality devices.

17. The charging system of claim 12, wherein the microcontroller is configured to control each of at least two charging protocol chips to detect the power requirement of the respective one of the plurality of devices by performing a handshake communication between each of the at least two charging protocol chips and the respective device based on a universal charging protocol.

* * * * *